July 22, 1958  W. G. CLARK  2,844,265
HYDRAULIC GOOSENECK
Filed Feb. 9, 1956  3 Sheets-Sheet 1
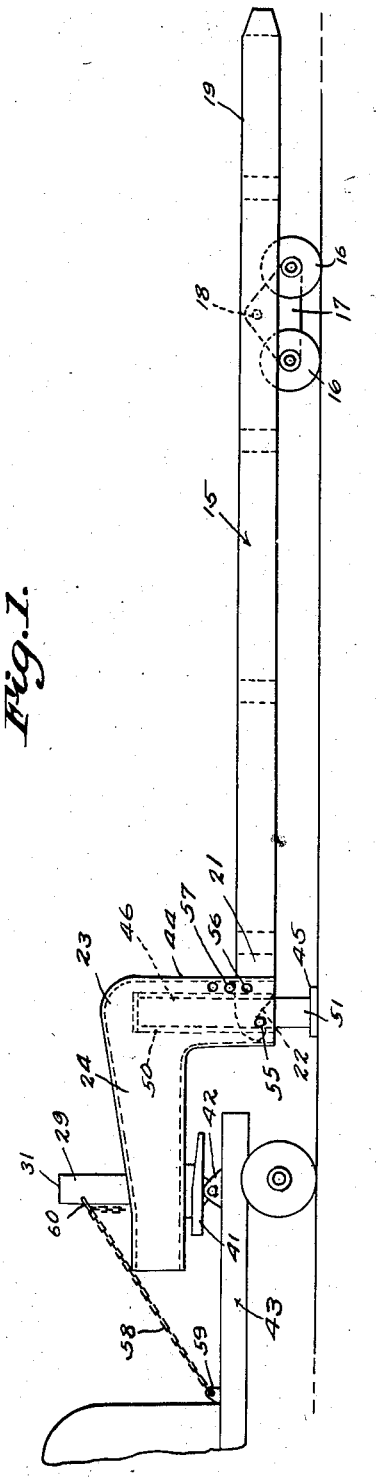
Fig. 1.
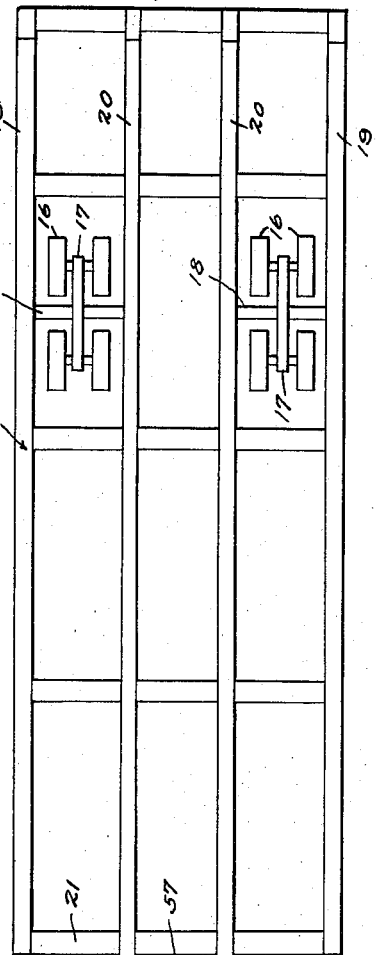
Fig. 2.
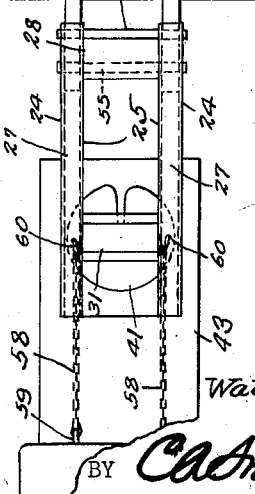
Walter G. Clark
INVENTOR
BY CASnow&Co.
ATTORNEYS.

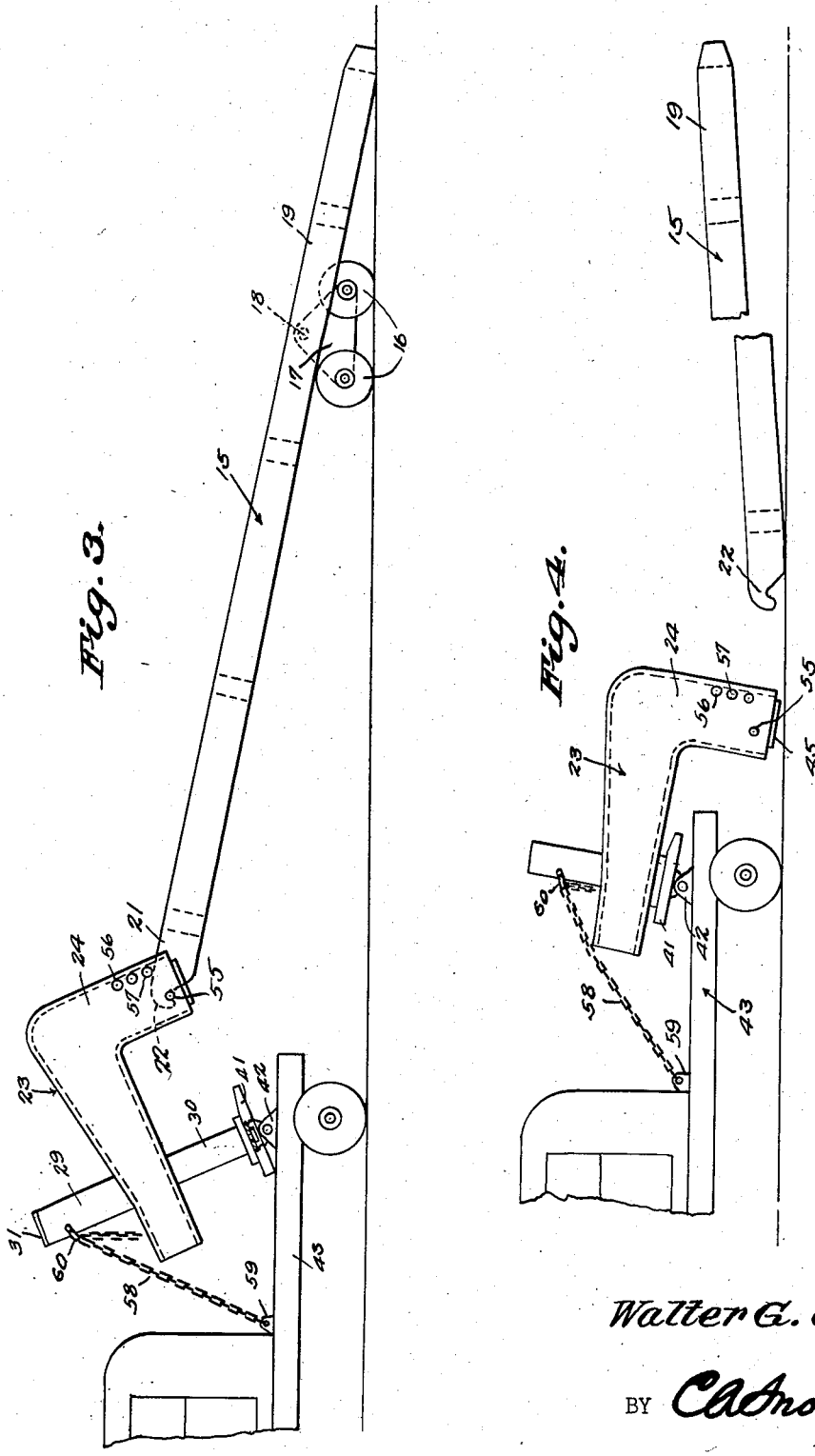

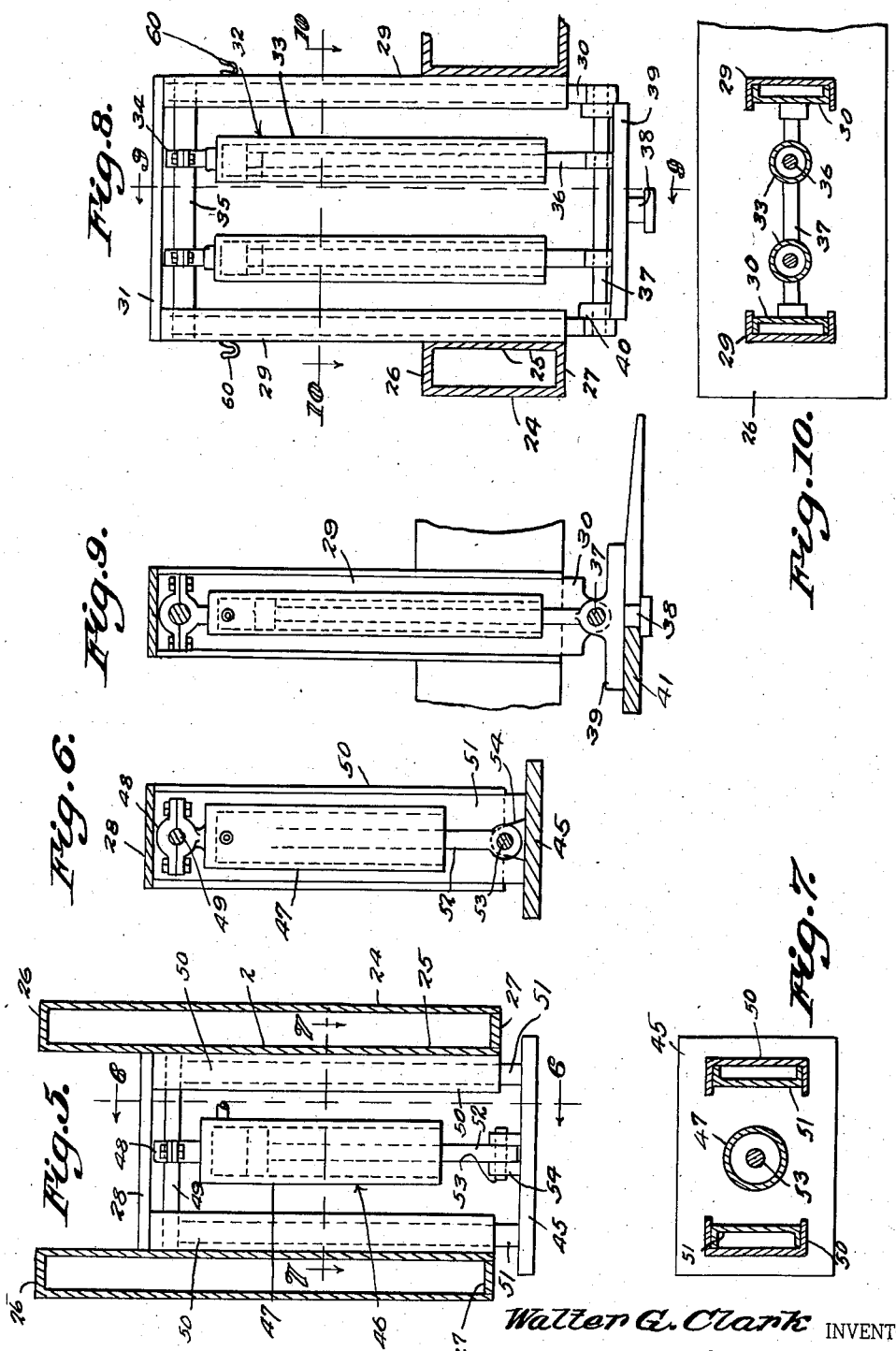

United States Patent Office 2,844,265
Patented July 22, 1958

2,844,265
HYDRAULIC GOOSENECK
Walter G. Clark, Charleston, W. Va.
Application February 9, 1956, Serial No. 564,446
3 Claims. (Cl. 214—506)

This invention relates to a trailer construction of the low body type, embodying a detachable gooseneck and means for supporting the detached gooseneck in a position above the ground.

Another object of this invention is to provide an improved trailer construction which will permit the elevating of the front end of the trailer to effect lowering of the trailer from the rear.

Another object of this invention is to provide in a low body trailer a detachable gooseneck which when detached will permit the loading or discharging of the trailer body from the front end thereof.

A further object of this invention is to provide in a low type trailer body a detachable gooseneck with a fifth wheel coupling pin carried by a hydraulic element which is vertically adjustable so that the front end of the gooseneck may be raised or lowered thereby to raise or lower the front end of the trailer body.

With the foregoing and other objects in view which will appear as the description proceeds, the invention consists of certain novel details of construction and combinations of parts, hereinafter more fully described and pointed out in the claims, it being understood that changes may be made in the construction and arrangement of parts without departing from the spirit of the invention as claimed.

Referring to the drawing:

Figure 1 is a side elevation of a trailer constructed according to an embodiment of this invention showing the rear end of the gooseneck raised by a hydraulic operator so as to level the body of the trailer prior to movement over the ground.

Fig. 2 is a top plan view of the trailer construction.

Fig. 3 is a detail side elevation of the trailer showing the same in elevated position at the front thereof.

Fig. 4 is a detail side elevation showing the gooseneck uncoupled from the trailer body and supported above the surface of the ground.

Fig. 5 is a detail front elevation of the hydraulic operator at the rear of the gooseneck.

Fig. 6 is a sectional view taken on line 6—6 of Fig. 5.

Fig. 7 is a sectional view taken on line 7—7 of Fig. 5.

Fig. 8 is a detail front elevation of the hydraulic operator disposed at the front portion of the gooseneck.

Fig. 9 is a sectional view taken on line 9—9 of Fig. 8.

Fig. 10 is a sectional view taken on line 10—10 of Fig. 8.

Referring to the drawings, the numeral 15 designates generally an elongated flat body which has wheels 16 disposed at the rear thereof. The wheels 16 are disposed in pairs and stationed at the opposite sides of the body 15. As shown in Fig. 2 the wheels are mounted on the rear ends of bolsters 17 which are of triangular configuration in side elevation and each bolster 17 is rockably mounted on a horizontal shaft 18 secured between longitudinal beams 19 and 20 disposed in the frame or body 15. The front ends of the beams 20, which are in the inner pair of beams extend forwardly from the front end 21 of the body 15, and each beam 20 is formed at the front end thereof with a hook 22. A gooseneck generally indicated at 23 is adapted to be adjustably coupled to the hooks 22 of body 15. The gooseneck 23 is formed of oppositely disposed pairs of side plates 24 and 25, respectively, the plates 25 being inner plates and the plates 24 being outer plates. The plates 24 and 25 are connected together by means of upper and lower plates 26 and 27. The plates 24 and 25 are of L-shape with a vertical rear side and a horizontal long side. The connected together plates are fixed together by means of a connecting bar or plate 28 which forms the cross head of a hydraulic means, as will be hereinafter described. The front end of the side members 24 and 25 are also connected together, being secured to vertically disposed channel members 29 which are disposed in confronting position and form guides for slide members 30. The upper ends of the guides 29 are connected to the cross head or connecting bar 31. A pair of hydraulic operators generally indicated at 32 are disposed between the guides 29 and the hydraulic operators include cylinders 33 which are rockably mounted at their upper ends, as indicated at 34, on a horizontal shaft 35. The horizontal shaft 35 is secured between the upper portions of the guides 29. The hydraulic operators 32 include plungers 36 extending from the lower ends of the cylinders 33 and the plungers 36 are rockably mounted on a shaft 37 which is connected between the slide members 30. A fifth wheel coupling pin 38 is mounted on a plate 39 formed with ears 40 which are loosely engaged about the shaft 37. The coupling pin 38 is adapted to detachably engage a fifth wheel member 41 which is rockably mounted as at 42 on the rear portion of a tractor vehicle 43.

The rear vertical side generally indicated at 44, of the gooseneck 23 is provided with an extendable trailer supporting foot 45 which is operated by means of a hydraulic operator, generally indicated at 46. The operator 46 includes a hydraulic cylinder 47 pivotally mounted as at 48 on a horizontal shaft 49 which is secured between a pair of vertically disposed confronting channel guide members 50. The channel guide members 50 are secured to the inner sides of the plates 24. The guide members 50 have slidably mounted therein vertically disposed slide bars 51 which are fixed at their lower ends to the foot plate or member 45. The cylinder 47 is slidably mounted in a plunger 52 which is rockably disposed on a pin 53 engaging through a pair of ears 54 fixed on the upper side of the foot 45. The plates 24 and 25 have secured therebetween a hook engaging bar 55 and the side plates 24 and 25 also are provided adjacent the rear thereof with aligned openings 56. The openings 56 are disposed in vertically spaced relation and a removable trailer locking bar 57 is adapted to be extended entirely across the two hooks 22 above the upper edges thereof so that the gooseneck 23 will be locked against movement relative to the body 15. The gooseneck 23 may be secured in an angularly disposed position with respect to the horizontal, by means of a pair of chains 58 which are secured at their forward ends to lugs 59 carried by the tractor vehicle 43. The chains 58 are adapted to engage over a pair of hooks 60 which are carried by the front guide members 29 adjacent the outer ends thereof. In this manner the guide 29 will be rocked forwardly to a position similar to that shown in Fig. 3 and the chains 58 are then extended over the hooks 60.

The hydraulic means 32 at the front of the gooseneck may then be released, whereupon the chains 58 will hold the gooseneck in its elevated and angularly disposed position with respect to the vertical. When the gooseneck 23 is detached from the trailer body 15, as shown in Fig. 4, the rear lower end of the gooseneck 23 may be raised upwardly above the ground by extending the foot 45 downwardly. At this time the chains 58 may be engaged with the hooks 60 in a position to lock the gooseneck in a downwardly and rearwardly inclined position but with the bottom of the gooseneck spaced above the ground. The foot 45 may then be elevated whereupon the lower end of the gooseneck may be held by the chains 58 above the surface of the ground. This position of the gooseneck will permit the tractor vehicle 43 to be moved about the surface of the ground without dragging the gooseneck. When the gooseneck is to be coupled to the trailer body 15 the tractor 43 is backed up to the hooks 22 and the gooseneck 23 at its rear is then lowered to a point just short of contact with the ground. In this position the hook engaging bar 55 will engage with the hooks 22. When the bar 55 is engaged with the hooks 22 the foot 45 is then extended downwardly thereby raising the front end of body 15 to a predetermined position, such as a horizontal position, as shown in Fig. 1. When body 15 is leveled the foot 45 is raised to its upper limit so that it will not drag on the ground when the trailer and tractor are moved over the road. When the body 15 is leveled to the position shown in Fig. 1, the locking bar 57 is extended through the middle openings 56 in the side members of the gooseneck whereupon the gooseneck and trailer body 15 will be locked together against downward movement relative to each other.

In the event the trailer is being drawn over track or other elevated hump the front of the trailer 15 may be elevated after the manner shown in Fig. 3 and secured in the elevated position by the chains 58. When the body 15 passes over the hump the elevated front end of the trailer may be lowered by disconnecting the chains 58 and dropping the gooseneck 23 at the front end thereof.

What is claimed is:

1. In combination, a tractor vehicle and a trailer, said tractor comprising an elongated flat body, wheels adjacent the rear of said body, a pair of hooks carried by and extending from the forward end of said body, a gooseneck, means carried by said gooseneck detachably coupling the latter to said hooks, said gooseneck having aligned vertically spaced openings in the rear thereof, a trailer locking bar engaging in selected openings, an hydraulic member carried by the forward end of said gooseneck, said hydraulic member including a cylinder, a plunger slidable in said cylinder, a fifth wheel coupling pin fixed relative to said plunger, and a flexible member connected between said tractor and said gooseneck whereby to effect upward rocking of the rear of said gooseneck simultaneously with extension of said plunger.

2. In combination, a tractor vehicle and a trailer, said tractor comprising an elongated flat body, wheels adjacent the rear of said body, a pair of hooks carried by and extending from the forward end of said body, a gooseneck, means carried by said gooseneck detachably coupling the latter to said hooks, an hydraulic member carried by the forward end of said gooseneck, said hydraulic member including a cylinder, a plunger slidable in said cylinder, a fifth wheel coupling pin fixed relative to said plunger, a flexible member connected between said tractor and said gooseneck whereby to effect upward rocking of the rear of said gooseneck simultaneously with extension of said plunger, a second hydraulic member carried by the rear of said gooseneck including an extensible gooseneck supporting foot adapted for downward projection to raise the rear end of said gooseneck in either coupled or uncoupled relation with respect to said trailer.

3. In combination, a tractor vehicle and a trailer, said trailer comprising an elongated flat body, a gooseneck, means detachably coupling said gooseneck with said trailer, a pair of confronting channel-shaped guides carried by the forward portion of said gooseneck, a pair of slide bars engaging said guides, a connecting plate fixed between the lower ends of said bars, a fifth wheel coupling pin carried by said plate, hydraulic means connected with said plate for raising or lowering the forward end of said gooseneck, a pair of chains, means securing one end of each chain to the tractor frame, and a pair of hooks carried by said guides adjacent the upper end thereof whereby said chains may be adjustably secured at the opposite ends thereof and effect upward rocking of the rear of the gooseneck with downward movement of said slide bars and plate.

References Cited in the file of this patent
UNITED STATES PATENTS

| | | |
|---|---|---|
| 2,389,211 | Pointer | Nov. 20, 1945 |
| 2,590,210 | Rogers | Mar. 25, 1952 |
| 2,628,126 | Black | Feb. 10, 1953 |
| 2,667,363 | Talbert | Jan. 26, 1954 |
| 2,689,137 | Iddings et al. | Sept. 14, 1954 |
| 2,717,707 | Martin | Sept. 13, 1955 |